Patented June 16, 1936

2,044,176

UNITED STATES PATENT OFFICE 2,044,176

NONINFLAMMABLE PAINT

Leon McCulloch, Pittsburgh, Pa., assignor to Westinghouse Electric & Manufacturing Company, East Pittsburgh, Pa., a corporation of Pennsylvania No Drawing. Application September 18, 1934, Serial No. 744,535

10 Claims. (Cl. 134—17)

This invention relates to paints and particularly to non-inflammable paints.

In electrical apparatus, such as dynamo-electric machinery, it is desirable to insulate windings and to render them fire-proof.

An object of this invention is to provide a paint which, when heated to ignition temperature, will liberate non-inflammable vapors which will not support combustion.

A further object of this invention is to provide a non-inflammable paint which flows evenly and smoothly, will dry quickly and will not decompose at the temperatures to which insulating materials are heated in the operation of dynamo-electric machinery.

In practicing this invention, antimony trioxide is added as an intimate mixture to a chlorinated product, such as chlorinated rubber, of the type known to the art as "Pergut", "Tornesite" and "Duroprene".

In order to produce a paint which brushes and flows evenly and smoothly, dries or bakes rapidly and remains tough and flexible, a plasticizer, which will react favorably with the mixture of chlorinated rubber and antimony trioxide, is employed. Through experiments, it has been discovered that stand oil, when employed as a plasticizer for the mixture, will produce a paint which will have the desired characteristics.

Experiments have proved that antimony trioxide, when employed with the chlorinated rubber and stand oil, will react favorably with the chlorinated rubber at ignition temperatures to form volatile chlorides of antimony which will be liberated in the form of vapor. This chloride vapor will not support combustion, and will efficiently extinguish flame.

In order to produce a paint which will have a black color, a pigment of bone black is intimately mixed with the chlorinated rubber, antimony trioxide and stand oil. The black color is desirable in paints which are employed in the windings of electrical apparatus. Bone black also has good insulating properties, which makes its use desirable in this type of paint.

Without a stibilizer as a constituent of the paint, it has been found at moderate and normal operating temperatures of electrical insulation, that is, around 100° C., that chlorinated rubber will decompose and become blackened and that certain metals upon which the paint is employed will become corroded. In order to prevent such decomposition, white lead or lead oxide is added as a suspension in the solution. One explanation of the reason that white lead or lead oxide is such a good stabilizer for the chlorinated product is that it is thought that the white lead or lead oxide reacts with the chlorinated product to form a non-reactive chloride which will not attack the chlorinated product but will prevent its decomposition.

Toluene is employed in preparing the paint because it is a good solvent for the chlorinated rubber and will dry rapidly without leaving a residue.

One of the preferred embodiments of the invention which was produced in accordance with this invention comprised the following composition:

| | | |
|---|---|---|
| Chlorinated rubber | g— | 100 |
| "Stand oil" (thickened linseed) | g— | 100 |
| Antimony trioxide ($Sb_2O_3$) | g— | 50 |
| White lead (basic lead carbonate) | g— | 10 |
| "Bone black" | g— | 100 |
| Toluene | cc— | 250 |

From the above disclosure, it is evident that a non-inflammable paint has been produced which brushes and flows evenly and smoothly, dries rapidly, is stable at baking temperatures, and will effectively extinguish flame.

It is, of course, to be understood that other chlorinated products such as halowax or aroclors may be employed in this paint rather than the chlorinated rubber herein referred to and that other solvents such as turpentine or carbon tetrachloride may be employed rather than the preferred solvent, toluene, as constituents of the non-inflammable paint above described, and that the proportions of the different constituents of the paint may be varied, without in any way departing from the spirit of the invention as set forth in the appended claims.

I claim as my invention:

1. A non-inflammable paint comprising a chlorinated carrier and antimony trioxide, the antimony trioxide being present in an amount sufficient to impart non-inflammable qualities to the paint.

2. A non-inflammable paint comprising a chlorinated carrier and antimony trioxide intimately associated whereby when the paint is heated to ignition temperature the antimony trioxide reacts with the chlorinated carrier to liberate a non-inflammable vapor.

3. In a non-inflammable paint, in combination, chlorinated rubber and a sufficient amount of antimony trioxide to impart non-inflammable qualities to the paint.

4. In a non-inflammable paint, in combination, chlorinated rubber and antimony trioxide intimately associated whereby when the paint is heated to ignition temperature the antimony trioxide reacts with the chlorinated rubber to liberate a non-inflammable vapor.

5. In a non-inflammable paint, in combination, a chlorinated carrier, antimony trioxide and a stabilizer for the chlorinated carrier, the antimony trioxide being present in an amount sufficient to impart non-inflammable qualities to the paint.

6. In a non-inflammable paint, in combination, a chlorinated carrier, antimony trioxide, and white lead as a suspension in the solution whereby a decomposition of the carrier is prevented, the antimony trioxide being present in an amount sufficient to impart non-inflammable qualities to the paint.

7. A non-inflammable paint comprising chlorinated rubber, stand oil, antimony trioxide and white lead, the antimony trioxide being present in an amount sufficient to impart non-inflammable qualities to the paint.

8. A non-inflammable paint comprising a chlorinated carrier, stand oil, antimony trioxide, white lead, an insulating pigment, and a solvent for the chlorinated carrier, the antimony trioxide being present in an amount sufficient to impart non-inflammable qualities to the paint.

9. A non-inflammable paint comprising a chlorinated carrier, stand oil, antimony trioxide, white lead, bone black and toluene, the antimony trioxide being present in an amount sufficient to impart non-inflammable qualities to the paint.

10. A non-inflammable paint comprising chlorinated rubber, stand oil, antimony trioxide, white lead, bone black and toluene, the antimony trioxide being present in an amount sufficient to impart non-inflammable qualities to the paint.

LEON McCULLOCH.